(12) United States Patent
Sekine

(10) Patent No.: US 6,588,905 B2
(45) Date of Patent: Jul. 8, 2003

(54) POLARIZING DEVICE AND PROJECTOR

(75) Inventor: Atsushi Sekine, Kasukabe (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/839,225

(22) Filed: Apr. 23, 2001

(65) Prior Publication Data

US 2002/0015134 A1 Feb. 7, 2002

(51) Int. Cl.⁷ .................. G03B 21/14; G03B 21/00; G03B 21/28; G02F 1/1335
(52) U.S. Cl. .................. 353/20; 353/31; 353/33; 353/81; 349/9; 359/487; 359/495; 359/496
(58) Field of Search .................. 353/20, 33, 81, 353/34, 37, 31; 359/495, 496, 487, 634; 349/9

(56) References Cited

U.S. PATENT DOCUMENTS

| | | | | |
|---|---|---|---|---|
| 6,019,474 A | * | 2/2000 | Doany et al. | 353/33 |
| 6,062,694 A | | 5/2000 | Oikawa et al. | 353/31 |
| 6,238,051 B1 | * | 5/2001 | Huang | 353/81 |
| 6,327,092 B1 | * | 12/2001 | Okuyama | 359/634 |
| 6,330,114 B1 | * | 12/2001 | Park et al. | 359/636 |
| 6,351,296 B1 | * | 2/2002 | Pilossof et al. | 349/57 |
| 6,404,552 B1 | * | 6/2002 | Manabe | 359/487 |

FOREIGN PATENT DOCUMENTS

JP 2599309 1/1997 ............ H04N/9/31

OTHER PUBLICATIONS

Yoshioka Takayuki, et al., Patent Abstracts of Japan, Liquid Crystal Projector, Oct. 22, 1991.

* cited by examiner

*Primary Examiner*—Russell Adams
*Assistant Examiner*—Melissa J Koval

(57) ABSTRACT

A polarizing device includes: a first prism substantially formed in a triangular shape; a second prism substantially formed in a triangular shape and bonded to the first prism; and a polarization splitter film provided at a bonding surface at which the first prism and the second prism are bonded to each other. A shape of a section of the first prism is determined so as to allow an optical axis of light having entered through one surface of the first prism to enter the polarization splitter film with an angle of incidence smaller than 45°.

12 Claims, 9 Drawing Sheets

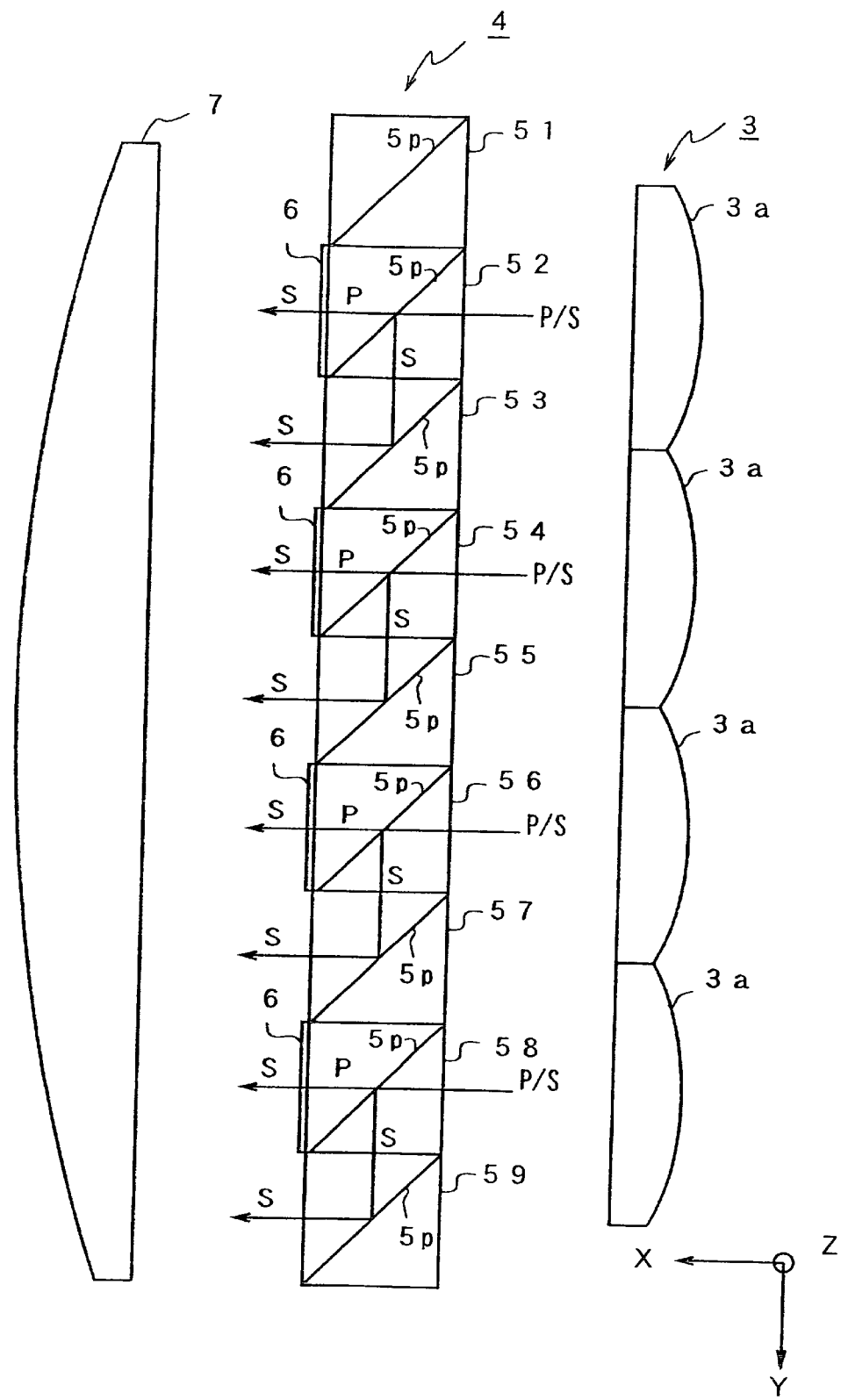

FIG. 4

| TEST PIECE NO. | 1 | 2 | 3 | 4 | 5 | 6 | 7 |
|---|---|---|---|---|---|---|---|
| $SiO_2$ (wt. %) | 27.2 | 25.9 | 25.4 | 24.9 | 24.4 | 23.9 | 23.4 |
| $Na_2O$ (wt. %) | 0.5 | 0.9 | 0.9 | 0.9 | 0.9 | 0.9 | 0.9 |
| $K_2O$ (wt. %) | 1.0 | 0.9 | 0.9 | 0.9 | 0.9 | 0.9 | 0.9 |
| $PbO$ (wt. %) | 71.0 | 72.0 | 72.5 | 73.0 | 73.5 | 74.0 | 74.5 |
| $As_2O_3$ (wt. %) | 0.3 | – | – | – | – | – | – |
| $Sb_2O_3$ (wt. %) | – | 0.3 | 0.3 | 0.3 | 0.3 | 0.3 | 0.3 |
| WAVELENGTH WITH SMALLEST ABSOLUTE VALUE OF PHOTOELASTIC CONSTANT (nm) | 368 | 397 | 412 | 444 | 482 | 528 | 650 |
| REFRACTIVE INDEX | 1.805 | 1.822 | 1.830 | 1.836 | 1.842 | 1.849 | 1.857 |

POLARIZING DEVICE AND PROJECTOR

INCORPORATION BY REFERENCE

The disclosure of the following priority application is herein incorporated by reference:
Japanese Patent Application No. 10-280165 filed Oct. 1, 1998.

BACKGROUND OF THE INVENTION

1. Field of the Invention

The present invention relates to a polarizing device and a projector More specifically, it relates to a polarizing device which is utilized when performing a polarization splitting on light fluxes corresponding to a plurality of colors resulting from a color separation performed on light emitted from a light source, guiding the light fluxes having undergone polarization splitting to a plurality of light valves and analyzing the light fluxes corresponding to the plurality of colors that have been modulated at the individual light valves, and a projector that composes (synthesizes) the light fluxes analyzed by using the polarizing device at a color composition optical system and projects the composed light on a screen via a projection lens.

2. Description of the Related Art

Projectors employed to project an image onto a screen in the known art include the projector disclosed in Japanese Patent Publication No. 2599309. To explain this projector in reference to FIG. 7, light source light emitted from a light source 61 undergoes color separation at dichroic mirrors 62 and 63 and thus becomes separated into R light, G light and B light which are then guided to polarization beam splitters 64R, 64G and 64B provided in correspondence to the different color light. Only the polarization split light in the light guided to the polarization beam splitters 64R, 64G and 64B is guided to reflection type light valves 65R, 65G and 65B. The light having entered the light valves 65R, 65G and 65B are modulated in correspondence to color signals input to the individual light valves when they are reflected at the light valves 65R, 65G and 65B. The light having been modulated and reflected at the light valves 65R, 65G and 65B are respectively guided to the polarization beam splitters 64R, 64G and 64B and only the modulated light are analyzed at the polarization beam splitters 64R, 64G and 64B and extracted. The analyzed light fluxes are then color-composed at a cross-dichroic prism 66 and a full color projected image is projected onto a screen (not shown) by a projection lens 67.

To explain the different color light fluxes obtained through the color separation achieved at the dichroic mirrors 62 and 63 in further detail, the optical axes of these different color light fluxes respectively enter the polarization splitter portions of the polarization beam splitter 64R, 64G and 64B with an angle of incidence of 45°. The light that has entered each polarization splitter portion undergoes polarization splitting and is separated into S-polarized light to be reflected at the polarization splitter portion and P-polarized light to be transmitted through the polarization splitter portion. The S-polarized light are allowed to enter the reflection type light valves 65R, 65G and 65B provided near the exit surfaces of the polarization beam splitters 64R, 64G and 64B provided in correspondence to the individual color light. The individual color light having been modulated and reflected at the reflection type light valves 65R, 65G and 65B re-enter the polarization splitter portions of the polarization beam splitters 64R, 64G and 64B respectively. The light fluxes having re-entered the polarization splitter portions undergo an analyzing and, as a result, the P-polarized light fluxes that are the modulated light fluxes are detected as transmitted light and are extracted. The analyzed light fluxes corresponding to the different colors then undergo a color composition at the cross dichroic prism 66. As explained above, the polarization beam splitters 64R, 64G and 64B are each constituted to function both as a polarization splitting optical system and as an analyzing optical system.

The polarization beam splitters 64R, 64G and 64B each assume a structure achieved by inserting a polarization splitter film between two isosceles right-triangular prisms and bonding them together, and they have a roughly square sectional shape.

The polarization beam splitters 64R, 64G and 64B provided in correspondence to the different colors of light are each formed in a cubic shape or a rectangular parallelopiped shape which is achieved by inserting a polarization splitter film between two isosceles right-triangular prisms with identical sectional shapes. In other words, the polarization beam splitters 64R, 64G and 64B may each be regarded as a block of optical glass. A problem arises when the three blocks are provided in correspondence to the different colors of light since the volumetric space occupied by the optical systems and the weight of the optical systems are bound to increase.

In addition, while the polarization beam splitters 64R, 64G and 64B fulfill a crucial function as analyzing optical systems as explained above, it is desirable to ensure that when the light that have been modulated while being reflected at the light valves 65R, 65G and 65B (linearly polarized light) are transmitted through transparent optical members (glass portions) constituting the polarization beam splitters 64R, 64G and 64B, they do not adversely affect the states of the polarization. Otherwise, the states of the polarization will change while the modulated to light fluxes are transmitted through the glass portions and, a result, modulated light different from the original modulated light will be detected, thereby reducing the contrast of the projected image.

While a glass prism material with a low photoelastic constant may be used to constitute the prisms to reduce the degree to which the polarization states change, the use of such a material which has a particularly large specific gravity among various optical glass materials will lead to an increase in the weight of the optical systems.

SUMMARY OF THE INVENTION

An object of the present invention is to provide a more compact and lightweight polarizing device and a more compact and lightweight projector which employees the polarizing device for polarization splitting and light analyzing.

In order to attain the above object, a polarizing device according to the present invention comprises: a first prism substantially formed in a triangular shape; a second prism substantially formed in a triangular shape and bonded to the first prism; a polarization splitter film provided at a bonding surface at which the first prism and the second prism are bonded to each other; and a shape of a section of the first prism being determined so as to allow an optical axis of light having entered through one surface of the first prism to enter the polarization splitter film with an angle of incidence smaller than 45°.

Another polarizing device according to the present invention comprises: a triangular first prism having a section substantially formed in an isosceles triangular shape having a first interior angle which is an obtuse angle and a second interior angle and a third interior angle which are acute angles equal to each other; a triangular second prism having a section substantially formed in a triangular shape having a first interior angle equal to the second interior angle and the third interior angle of the first prism; and a polarization splitter film provided at a bonding surface at which a first surface of the first prism facing opposite the first interior angle and one surface of the second prism, which is one of two surfaces enclosing the first interior angle of the second prism, are bonded to each other, and a second surface and a third surface respectively faces opposite the second interior angle and the third interior angle of the first prism, an angle of incidence at the polarization splitter film of an optical axis of light having entered through the second surface is equal to the second interior angle and the third interior angle of the first prism, and the light reflected at the polarization splitter film exits through the third surface of the first prism.

Another polarizing device according to the present invention comprises: a first prism with a section substantially formed in an isosceles triangular shape having a first interior angle which is an obtuse angle and a second interior angle and a third interior angle which are acute angles equal to each other; a second prism with a section substantially formed in a triangular shape having at least one first interior angle set equal to the second interior angle and the third interior angle of the first prism which are acute angles; and a polarization splitter film provided at a bonding surface at which a first surface of the first prism facing opposite the first interior angle and a first surface which is one of two surfaces enclosing the first interior angle of the second prism, are bonded to each other, and light is allowed to enter the second prism through a second surface which is one of the two surfaces enclosing the first interior angle of the second prism, and light transmitted through the polarization splitter film exits through a second surface of the first prism facing opposite the second interior angle.

A projector according to the present invention comprises: a color separation optical system that separates a light flux emitted by a light source into light fluxes corresponding to a plurality of colors; a plurality of light valves provided in correspondence to the plurality of colors of light fluxes respectively; a plurality of polarizing devices provided to achieve polarization splitting of the light fluxes corresponding to the plurality of colors having exited the color separation optical system, guide the light fluxes to the plurality of light valves and individually analyze the light fluxes corresponding to the plurality of colors having been modulated at the plurality of light valves; and a color composition optical system that composes the light fluxes corresponding to the plurality of colors having been analyzed at the plurality of the polarizing devices and having exited the plurality of polarizing devices, and each of the polarizing devices comprises: a first prism substantially formed in a triangular shape; a second prism substantially formed in a triangular shape and bonded to the first prism; a polarization splitter film provided at a bonding surface at which the first prism and the second prism are bonded to each other; and a shape of a section of the first prism being determined so as to allow an optical axis of light having entered through one surface of the first prism to enter the polarization splitter film with an angle of incidence smaller than 45°.

An optical apparatus according to the present invention comprises: a light valve; and a light analyzing device that analyzes light exiting the light valve, and the light analyzing device comprises: a first prism having a section substantially formed in a triangular shape; a second prism having a section substantially formed in a triangular shape and bonded to the first prism; a polarization splitter film provided between bonding surfaces of the first prism and the second prism; and a shape of a section of the first prism being determined so as to allow an optical axis of light having entered through one surface of the first prism from the light valve to enter the polarization splitter film with an angle of incidence smaller than 45°.

Another optical apparatus according to the present invention comprises: a light valve; and a light analyzing device that analyzes light exiting the light valve, and the light analyzing device comprises: a first prism with a section substantially formed in an isosceles triangular shape having a first interior angle which is an obtuse angle and a second interior angle and a third interior angle which are acute angles equal to each other; a second prism with a section substantially formed in a triangular shape having at least one first interior angle equal to the second interior angle and the third interior angle of the first prism which are acute angles; a polarization splitter film provided at a bonding surface at which a first surface of the first prism facing opposite the first interior angle and a first surface which is one of two surfaces of the first surface and a second surface enclosing the first interior angle of the second prism, are bonded to each other; and a second surface and a third surface facing opposite the second interior angle and the third interior angle respectively at the first prism, and the light having exited the light valve being caused to enter the first prism through the second surface of the first prism.

In this optical apparatus, it is preferred that analyzed light in light which has exited the light valve and entered through the second surface of the first prism at the light analyzing device exits through the third surface of the first prism or the second surface of the second prism.

A projection type display apparatus according to the present invention comprises: a light valve; an optical device that guides light obtained by achieving polarization splitting on incident light to the light valve and analyzes light having exited the light valve; and a projection lens that projects the light analyzed by the optical device, and: the optical device comprises a first prism and a second prism both with a section substantially formed in a triangular shape and a polarization splitter film provided at a bonding surface between the first prism and the second prism; and an optical axis of the incident light having entered through one surface of the first prism, enters the polarization splitter film at an angle of incidence smaller than 45° and reflected light or transmitted light achieved through the polarization splitter film is allowed to enter the light valve.

Another projection type display apparatus according to the present invention comprises: a light valve; an optical device that guides light obtained by achieving polarization splitting on incident light to the light valve and analyzes light having exited the light valve; and a projection lens that projects the light analyzed by the optical device, and the optical device comprises: a first prism with a section substantially formed in an isosceles triangular shape having a first interior angle which is an obtuse angle and a second interior angle and a third interior angle which are acute angles equal to each other; a second prism with a section substantially formed in a triangular shape having at least one first interior angle equal to the second interior angle and the third interior angle of the first prism which are acute angles; a polarization splitter film provided at a bonding surface at which a first surface of the first prism facing opposite the first interior angle and a first surface which is one of two surfaces of the first surface and a second surface enclosing the first interior angle of the second prism, are bonded to each other; and a second surface and a third surface facing opposite the second interior angle and the third interior angle of the first prism respectively, the incident light being caused to enter the first prism through the second surface of the first prism, and reflected light obtained at the polarization splitter film being allowed to exit the first prism through the third surface of the first prism to enter the light valve.

Another projection type display apparatus according to the present invention comprises: a light valve; an optical device that guides light obtained by achieving polarization splitting on incident light to the light valve and analyzes light having exited the light valve; and a projection lens that projects the light analyzed by the optical device, and the optical device comprises; a first prism with a section substantially formed in an isosceles triangular shape having a first interior angle which is an obtuse angle and a second interior angle and a third interior angle which are acute angles equal to each other; a second prism with a section substantially formed in a triangular shape having at least one first interior angle equal to the second interior angle and the third interior angle which are acute angles at the first prism; a polarization splitter film provided at a bonding surface at which a first surface of the first prism facing opposite the first interior angle and a first surface which is one of two surfaces enclosing the first interior angle of the second prism, are bonded to each other; and the incident light allowed to enter the second prism through a second surface which is one of the two surfaces enclosing the first interior angle of the second prism, and light having been transmitted through the polarization splitter film allowed to exit the first prism through a second surface of the first prism to enter the light valve.

A compound prism member according to the present invention comprises: a triangular first prism with a section substantially formed in an isosceles triangular shape having a first interior angle which is an obtuse angle and a second interior angle and a third interior angle which are acute angles equal to each other; a triangular second prism with a section substantially formed in a triangular shape having at least one first interior angle equal to the second interior angle and the third interior angle of the first prism which are acute angles; and a polarization splitter film provided at a bonding surface at which a first surface of the first prism facing opposite the first interior angle and a first surface which is one of two surfaces of the first surface and a second surface enclosing the first interior angle of the second prism, are bonded to each other.

Another projector according to the present invention comprises: a color separation optical system that separates a light flux emitted by a light source into light fluxes corresponding to a plurality of colors; a plurality of light valves provided in correspondence to the plurality of colors of light fluxes respectively; a plurality of polarizing devices provided to achieve polarization splitting of the light fluxes corresponding to the plurality of colors having exited the color separation optical system, guide the light fluxes to the plurality of light valves and individually analyze the light fluxes corresponding to the plurality of colors having been modulated at the plurality of light valves and then guided to the plurality of polarizing devices; and a color composition optical system that composes the light fluxes corresponding to the plurality of colors having been analyzed at the plurality of the polarizing devices and having exited the plurality of polarizing devices, and: the plurality of polarizing devices each includes a polarization splitter film through which one light flux emitted from the color separation optical system undergoes polarization splitting to be guided to one of the light valves and the one light flux having been modulated at the light valve and having been guided to the polarization splitter film is analyzed; and the polarization splitter films at the plurality of polarizing devices are formed so as to ensure that optical axes of light fluxes corresponding to the plurality of colors having been analyzed at the plurality of polarizing devices and having exited the plurality of polarizing devices enter the color composition optical system parallel to one another or perpendicular to one another and that the optical axes of the light fluxes corresponding to the plurality of colors exiting the color separation optical system enter the polarization splitter films at an angle of incidence smaller than 45°.

BRIEF DESCRIPTION OF THE DRAWINGS

FIG. 2 shows in an enlargement the vicinity of the area where the beam splitter array is provided in the projector;

FIG. 4 presents data on the compositions and the characteristics of optical materials that may be used in the polarizing device (polarization beam splitters) achieved in the embodiments of the present invention;

DESCRIPTION OF THE PREFERRED EMBODIMENTS

Figure 1:
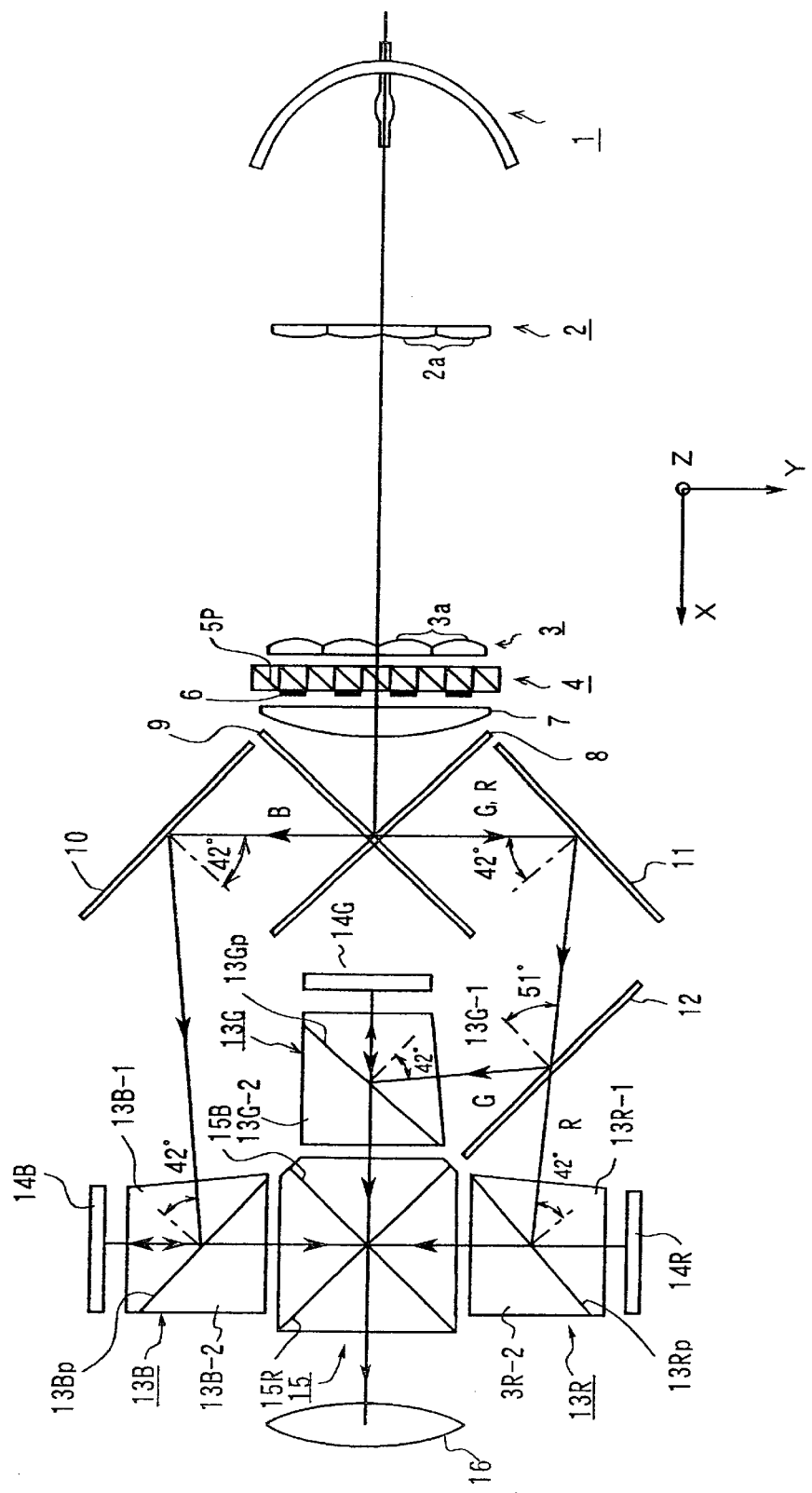
FIG. 1 illustrates the structure of a projector achieved in an embodiment of the present invention.

The structure adopted in the projector in an embodiment of the present invention is illustrated in FIG. 1. In order to simplify an explanation given with regard to the direction along which a light beam advances and the like, an X axis and a Y axis extending perpendicular to each other and a Z axis extending perpendicular to the sheet of paper on which FIG. 1 is drawn are defined as illustrated in FIG. 1. In addition, the arrows and lines indicating the direction along which a light beam advances in FIG. 1 each represent light traveling at the center of a light flux and, in this context, the light traveling at the center of the light flux is defined as an "optical axis".

Light source light containing roughly parallel light fluxes emitted along direction +X from a light source 1 having a lamp and a concave mirror with a reflecting surface formed in a parabolic shape enters a first lens plate 2. The first lens plate 2 is constituted by setting a plurality of small lenses 2a on a plane, and the light source light having entered first lens plate 2 is divided through openings defined in conformance to the external shape of the small lenses 2a. It is to be noted that the external shape of the small lenses 2a is essentially similar to the external shape of light valves 14R, 14G and 14B (the shape of the illumination targets) to be explained later that are to be illuminated by the light.

At a focal points position of the small lenses 2a of the first lens plate 2, a second lens plate 3 constituted by setting a plurality of small lenses 3a on a plane is provided. The plurality of small lenses 3a are each provided to face opposite one of the plurality of small lenses 2a. The first lens plate 2 and the second lens plate 3 described above constitute a so-called separation type fly-eye integrator.

In the structure described above, a secondary light source image (bright spot) formed by the corresponding small lens 2a of the first lens plate 2 is formed on each small lens 3a of the second lens plate 3. It is to be noted that the first lens plate 2 and the second lens plate 3 may each be formed as an integrated unit through glass press technology or they may each be formed as an integrated unit by using transparent plastic.

In FIG. 2 showing in an enlargement the area where the second lens plate 3 in FIG. 1 is provided, the light having originated from each bright spot, having been transmitted through the small lens 3a and having exited the small lens 3a then enters a polarization beam splitter array 4 provided near the exit surface of the second lens plate 3. The beam splitter array 4 is constituted of a laminated body achieved by laminating a plurality of (9 in the embodiment) polarization beam splitter prisms 51~59 and a plurality of halfwave phase plates 6 each provided at the exit surfaces of a specific polarization beam splitter prism. The width (the measurement along direction Y) of each of the polarization beam splitter prisms 51~59 is half the measurement of each small lens 3a along direction Y, whereas the measurement of the polarization beam splitter prisms taken along direction Z roughly matches the measurement of the second lens plate 3 taken along direction Z.

To explain the positional relationship between the small lenses 3a and the polarization beam splitter prisms 51~59 along direction Y, the polarization beam splitter prisms 52, 54, 56 and 58 are each aligned at the center of a lens 3a and the polarization beam splitter prisms 51, 53, 55 and 57 are aligned at the boundaries of the small lenses 3a. In addition, polarization splitter portions 5p are bonded at the individual polarization beam splitter prisms 51~59 so that they are all set parallel to one other, to constitute the beam splitter array 4.

The halfwave phase plates 6 are only provided at the exit surfaces of the polarization beam splitter prisms 52, 54, 56 and 58 aligned to the centers of the lenses 3a. In other words, the halfwave phase plates 6 are provided at the exit surfaces of the alternate polarization beam splitter prisms among the plurality of polarization beam splitter prisms provided along direction Y.

In the structure described above, light fluxes emitted from the bright spots formed near the centers of the lenses 3a at the second lens plate 3 enter the polarization beam splitter prisms 52, 54, 56 and 58 and reach the corresponding polarization splitter portions 5p. At each polarization splitter portion 5p, P-polarized light is transmitted and S-polarized light is reflected. The P-polarized light fluxes having been transmitted through the polarization splitter portions 5p are then converted to S-polarized light at the halfwave phase plates 6 provided at the exit surfaces of the polarization beam splitter prisms 52, 54, 56 and 58 and the S-polarized light resulting from the conversion exits the polarization beam splitter prisms 52, 54, 56 and 58.

The S-polarized light fluxes having entered the adjacent polarization beam splitter prisms 53, 55, 57 and 59 after having been reflected at the polarization splitter portions 5p are reflected at the polarization splitter portions 5p at the polarization beam splitter prisms 53, 55, 57 and 59 and exit through the exit surfaces of the polarization beam splitter prisms 53, 55, 57 and 59 still as the S-polarized light fluxes. As explained above, through the first lens plate 2, the second lens plate 3 and the polarization beam splitter array 4, all the light source light that is initially random polarized light is converted to S-polarized light.

Back in FIG. 1, the S-polarized light having exited the beam splitter array 4, passes through a field lens 7 and enters a cross dichroic mirror achieved by providing dichroic mirrors 8 and 9 in an X shape.

The dichroic mirror 8 achieves spectral transmission characteristics that reflect B (blue) light and allow G (green) light and R (red) light to be transmitted, whereas the dichroic mirror 9 achieves spectral transmission characteristics that reflect G-light and R-light and allow B-light to be transmitted. The cross dichroic mirror has a function of achieving color separation for the S-polarized light having entered the cross dichroic mirror to separate it into B-light which advances along direction −Y perpendicular to the optical axis of the incident light (direction X) and mixed light constituted of R-light and G-light that advances along direction +Y opposite from the direction along which the B-light advances.

The optical axis of the B-light enters a bending mirror 10 at a 42° angle relative to the normal of the bending mirror 10 and is reflected. The reflected light then advances with a tilt toward +Y relative to direction X to enter a polarization beam splitter 13B.

The optical axis of the G/R mixed light enters a bending mirror 11 at an angle of incidence of 42° relative to the normal of the bending mirror 11 and is reflected. The reflected light then advances with a tilt toward −Y relative to direction X and enters a dichroic mirror 12 which is provided by ensuring that the angle of incidence of the optical axis is 51° relative to the normal of the dichroic mirror 12.

The dichroic mirror 12 achieves characteristics that reflect G-light and allow R-light to be transmitted, and thus, it implements color separation on the incident light to separate it into G-light that is reflected in accordance with the law of reflection and R-light that is allowed to be transmitted and advance forward.

As explained, the cross dichroic mirror constituted of the dichroic mirrors 8 and 9 and the dichroic mirror 12 constitute a color separation optical system that achieves color separation for the light source light and separates it into R-light, G-light and B-light.

The G-light and the R-light resulting from the color separation achieved at the dichroic mirror 12 as described above then enter polarization beam splitters 13G and 13R respectively.

The optical axes of the light corresponding to the different colors resulting from the color separation described above then enter the polarization splitter portions 13Rp 13Gp and 13Bp respectively formed in the polarization beam splitters 13R, 13G and 13B with an angle of incidence of 42°.

The individual color light fluxes having entered the polarization splitter portions 13Rp 13Gp and 13Bp are reflected at the polarization splitter portions 13Rp 13Gp and 13Bp and exit the polarization beam splitters 13R, 13G and 13B still as the S-polarized light. At this point, the optical axis of the light exiting the polarization beam splitter 13R extends along direction Y, the optical axis of the light exiting the polarization beam splitter 13G extends along direction –X and the optical axis of the light exiting the polarization beam splitter 13B extends along direction –Y.

It is to be noted that since only the S-polarized light enters the polarization splitter portions 13Rp 13Gp and 13Bp and the S-polarized light is reflected at the polarization splitter portions 13Rp 13Gp and 13Bp still as S-polarized light, as explained above, they may appear as if the polarization splitter portions were not fulfilling the polarization splitting function. However, due to a production error occurring while manufacturing the beam splitter array 4, and a change in the polarization states occurring when the S-polarized light is transmitted through the dichroic mirrors 8, 9 and 12, the light entering the polarization splitter portions 13Rp 13Gp and 13Bp actually contains P-polarized light. Such P-polarized light is polarized and separated at the polarization splitter portions 13Rp 13Gp and 13Bp.

Alternatively, the beam splitter array 4 may be eliminated altogether and the light fluxes may be guided to the polarization beam splitters 13R, 13G and 13B still as random polarized light to implement polarization splitting at the polarization beam splitters 13R, 13G and 13B. In this case, since P-polarized light becomes discarded after having been transmitted through the polarization beam splitters 13R, 13G and 13B, the efficiency with which the light is utilized is lowered compared to the efficiency achieved by employing the beam splitter array 4.

Reflection type liquid crystal light valves 14R, 14G and 14B are provided on the optical axes near the exit surfaces of the polarization beam splitters 13R, 13G and 13B (hereafter, the reflection type liquid crystal light valves are simply referred to as "light valves" ). Color signals (image signals) corresponding to the different colors of light are input to the light valves 14R, 14G and 14B and the light valves 14R, 14G and 14B function as phase plate layers in correspondence to the color signals thus input. When light in a given color is reflected at the corresponding light valves 14R, 14G and 14B, modulated light becomes P-polarized light and light which has remained unmodulated is reflected as S-polarized light unchanged from the state it was in when the light entered the light valve (hereafter in this specification, modulated light is referred to as "modulated light" and light that has not been modulated is referred to as "unmodulated light").

It is to be noted that while light valves adopt either the optical write system or the electrical write system in the known art, light valves adopting the electrical write system are better suited for miniaturization. Thus, it is desirable to utilize light valves adopting the electrical write system in the embodiment.

The modulated light and the unmodulated light having been reflected at the light valves 14R, 14G and 14B as described above, then travel backward in the optical paths through which they enter the light valves 14R, 14G and 14B. The optical axes of these modulated light and unmodulated light enter the polarization beam splitters 13R, 13G and 13B from the reverse direction, i.e., they enter the polarization splitter portions 13Rp 13Gp and 13Bp at an angle of incidence of 42°. Then, the modulated light and the unmodulated light undergo a light analyzing process in which the modulated light, i.e. the P-polarized light, in the light having entered the polarization splitter portions 13Rp 13Gp and 13Bp are transmitted through the polarization splitter portions 13Rp 13Gp and l3Bp and the unmodulated light, i.e., the S-polarized light, are reflected at the polarization splitter portions 13Rp 13Gp and 13Bp.

As described above, the modulated light in the light corresponding to the individual colors which have been reflected at the light valves 14R, 14G and 14B are transmitted through the polarization splitter portions 13Rp 13Gp and 13Bp respectively and advance until they enter a cross dichroic prism 15 constituting the color composition optical system from three directions.

The cross dichroic prism 15 is formed by combining four prisms so as to cross a dichroic film 15B that reflects B-light and allows R-light and G-light to be transmitted and a dichroic film 15R that reflects R-light and allows G-light and B-light to be transmitted in an X shape.

The B-color modulated light having been modulated at the light valve 14B and analyzed at the polarization splitter portion 13Bp enters the cross dichroic prism 15 where it is reflected at the dichroic film 15B and enters a projection lens 16. The R-color modulated light having been modulated at the light valve 14R and analyzed at the polarization splitter portion 13Rp enters the cross dichroic prism 15 where it is reflected at the dichroic film 15R and enters the projection lens 16. The G-color modulated light having been modulated at the light valve 14G and analyzed at the polarization splitter portion 13Gp enters the cross dichroic prism 15 where it is transmitted through the dichroic films 15R and 15B and enters the projection lens 16. The modulated light corresponding to the R color, G color and the B color undergoes color composition at the cross dichroic prism 15 as described above and a projected image is projected in color onto a screen (not shown) via the projection lens 16.

Now, a detailed explanation is given on the projection beam splitters 13R, 13G and 13B that constitute a polarizing device engaged in polarization splitting and light analyzing in the projector described above.

Figure 3A:
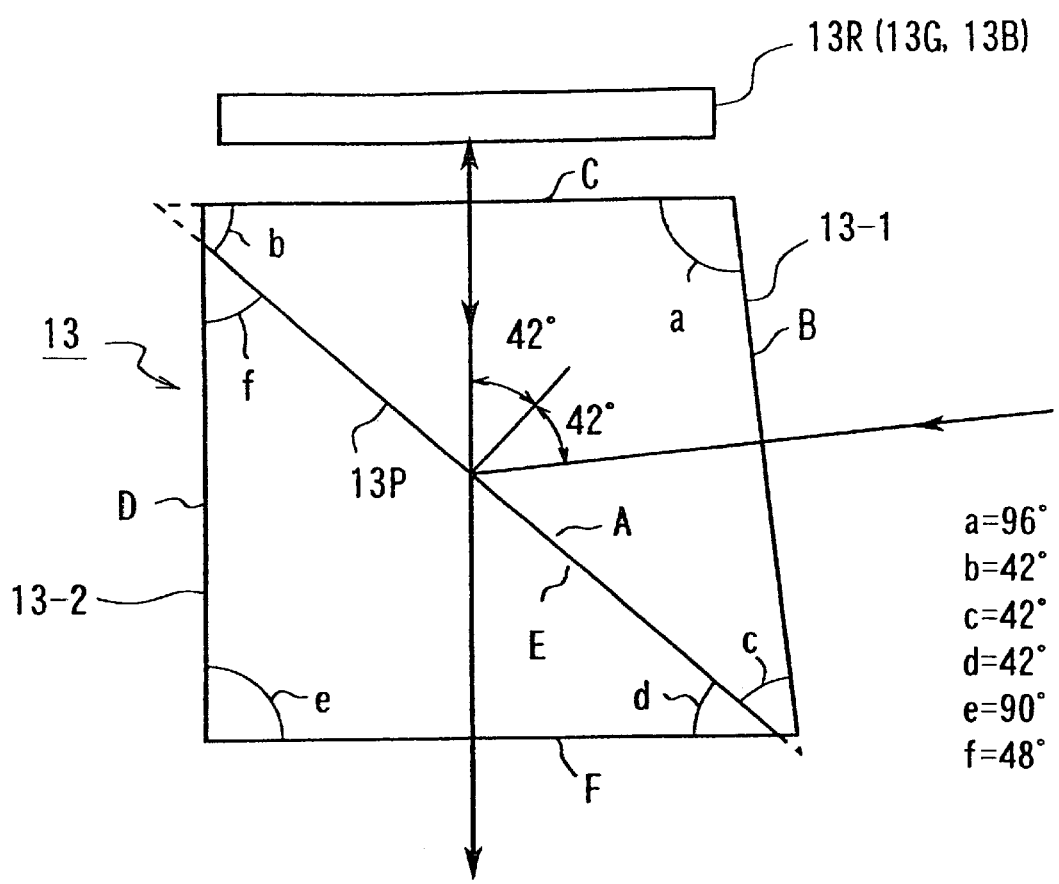
FIG. 3A is a sectional view of a polarizing device (polarization beam splitter) achieved in an embodiment of the present invention, presenting an example in which light is reflected at the polarization splitter portion and is guided to the light valve.
Figure 3B:
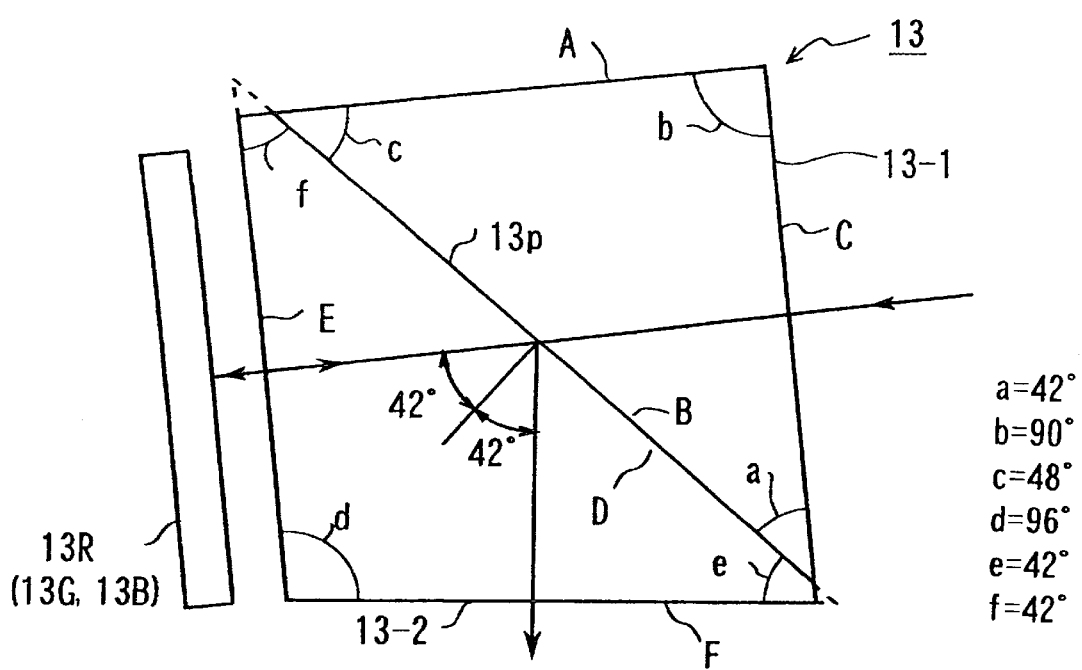
FIG. 3B is a sectional view of a polarizing device (polarization beam splitter) achieved in an embodiment of the present invention, presenting an example in which light is transmitted through the polarization splitter portion instead of being reflected at the polarization splitter portion and is guided to the light valve.
Figure 3C:
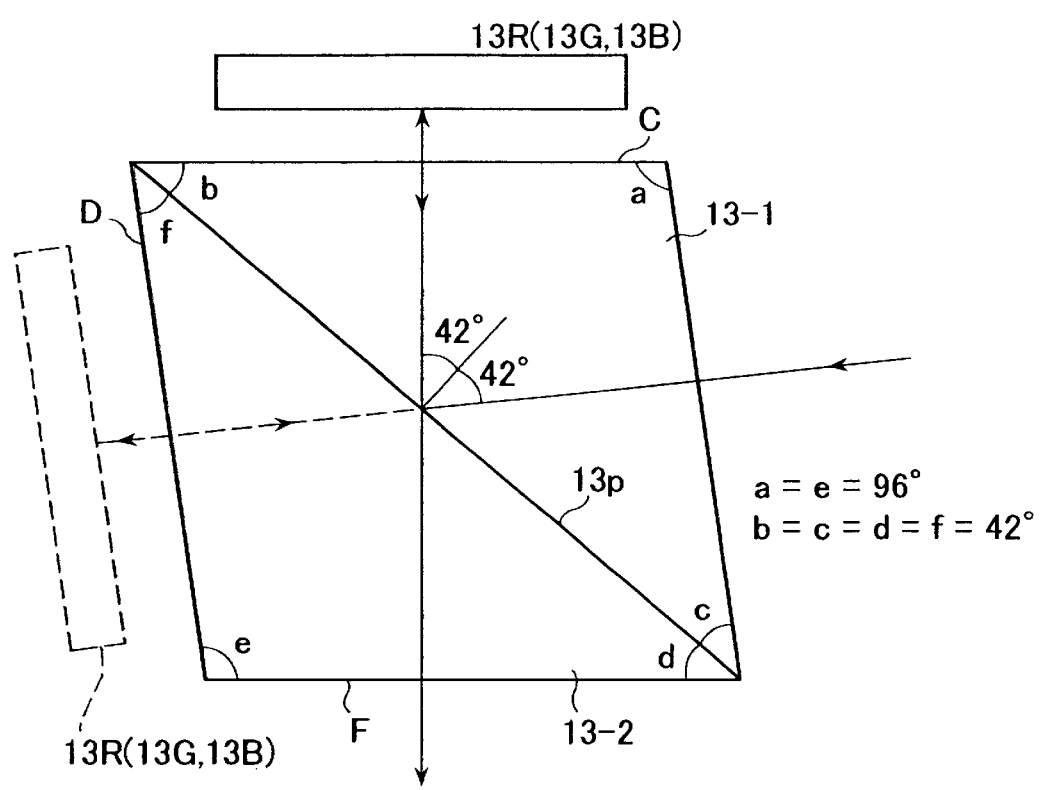
FIG. 3C is a sectional view of another polarizing device (polarization beam splitter) achieved in an embodiment of the present invention.

In reference to FIG. 3A showing the shape of a section of the polarization beam splitters 13R, 13G and 13B taken along the X Y plane in FIG. 1, the shape of the polarization beam splitters 13R, 13G and 13B is explained. It is to be noted that while the polarization beam splitter in FIG. 3A is assigned with reference numeral 13, the shapes of the polarization beam splitters 13R, 13G and 13B are all identical to that of the polarization beam splitter 13 in FIG. 3A. In addition, the sectional shape explained below invariably refers to the shape of the section of the X Y plane in FIG. 1. FIGS. 3B and 3C are to be explained later.

The polarization beam splitter 13 is constituted by inserting a polarization splitter portion 13p between a first prism member 13-1 and a second prism member 13-2 and bonding them together. The polarization splitter portion 13p, which is formed through evapolation, only needs to be formed at the bonding surface of either the first prism member 13-1 or the second prism member 13-2.

The shape of a section of the first prism member 13-1 is an isosceles triangle having an interior angle a which is an obtuse angle and the remaining interior angles b and c equal to each other, and in the embodiment, the interior angle a is set at 96° with the interior angles b and c set at 42°. The sectional shape of the second prism member 13-2 is a triangle having an interior angle d which is equal to the interior angle b (interior angle c), i.e., 42° in the embodiment, an interior angle e which is 90° and an interior angle f which is 48°. It is to be noted that in the following explanation, the sides that face opposite the interior angle a, the interior angle b and the interior angle c of the first prism member are respectively referred to as side A, side B and side C and the sides facing opposite the interior angle d, the interior angle e and the interior angle f of the second prism member 13-2 are respectively referred to as side D, side E and side F. The first prism member 13-1 and the second prism member 13-2 are formed as triangular prisms each achieving a thickness along the direction perpendicular to the sheet of paper on which FIG. 3A is drawn. It is to be noted that the vertices of the interior angles b and c of the first prism member 13-1 are indicated by dotted lines in FIG. 3A since unnecessary portions are eliminated. The first prism member 13-1 and the second prism member 13-2 are bonded to each other at the surface on side A facing opposite the obtuse interior angle a of the first prism and at the surface on side E, one of the two sides E and F enclosing the interior angle d of the second prism member 13-2, i.e., the interior angle equal to the interior angle b of the first prism member 13-1. In the polarization beam splitter 13 structured as described above, the surface on side F and the surface on side C are parallel to each other.

Light entering the polarization beam splitter 13 is guided in through the surface on side B, one of the two sides enclosing the interior angle c, so as to allow the optical axis of the light to achieve an angle of incidence of 42°, which is equal to the interior angle b, relative to the polarization splitter portion 13p. The light is reflected at the polarization splitter portion 13p and exits through the surface on side C facing opposite the interior angle c. The light having exited through the surface on side C enters the light valve 13R (13G, 13B), where it is reflected and becomes mixed light constituted of modulated light and unmodulated light. The modulated light and the unmodulated light advances through the first prism member 13-1 again. The modulated light alone is analyzed at the polarization splitter portion 13p, then advances linearly and is transmitted through the second prism member 13-2 to exit through side F.

Next, the materials that may be used to constitute the first prism member 13-1 and the prism member 13-2 are explained. As described above, the light corresponding to the different colors modulated when reflected at the light valves 14R, 14G and 14B enters the polarization beam splitters 13R, 13G and 13B to undergo a light analyzing process. At this time, linearly polarized light fluxes pass through the first prism members 13R-1, 13G-1 and 13B-1 and the second prism members 13R-2, 13G-2 and 13B-2 (see FIG. 1) respectively constituting the polarization beam splitters 13R, 13G and 13B. Accordingly, it is necessary to minimize any change occurring in the polarization states in the prisms.

If the S-polarized light fluxes corresponding to the individual colors achieved through the three color separation optical systems become disrupted as to polarization while they travel through the polarization beam splitters, the disrupted polarized light fluxes will enter the light valves. In addition, the modulated light fluxes in the light reflected at the light valves 14R, 14G and 14B all contain P-polarized light, and if such a polarization state changes while the modulated light is transmitted through the polarization beam splitters 13R, 13G and 13B, the contrast of the projected image becomes lowered.

In consideration of the points discussed above, the first prism members 13R-1, 13G-1 and 13B-1 and the second prism members 13R-2, 13G-2 and 13B-2 constituting the polarization beam splitters 13R, 13G and 13B respectively must be formed by using a material that does not allow the polarization state of polarized light which enters them to change readily. When these members are constituted by using a standard glass material such as BK7, the value of the photoelastic constant which is used as an index when ascertaining the rate of the occurrence of double refraction at the glass members is $2.78 \times 10^{-8}$ cm$^2$/N. When the photoelastic constant is as high as this, the degree to which the contrast is lowered due to the occurrence of birefringence becomes not negligible.

FIG. 4 presents a table of the compositions, the refractive indices and the wavelength values corresponding to the lowest photoelastic constant values of glass prism materials that may be used to constitute the polarization beam splitters according to the present invention.

Figure 5:
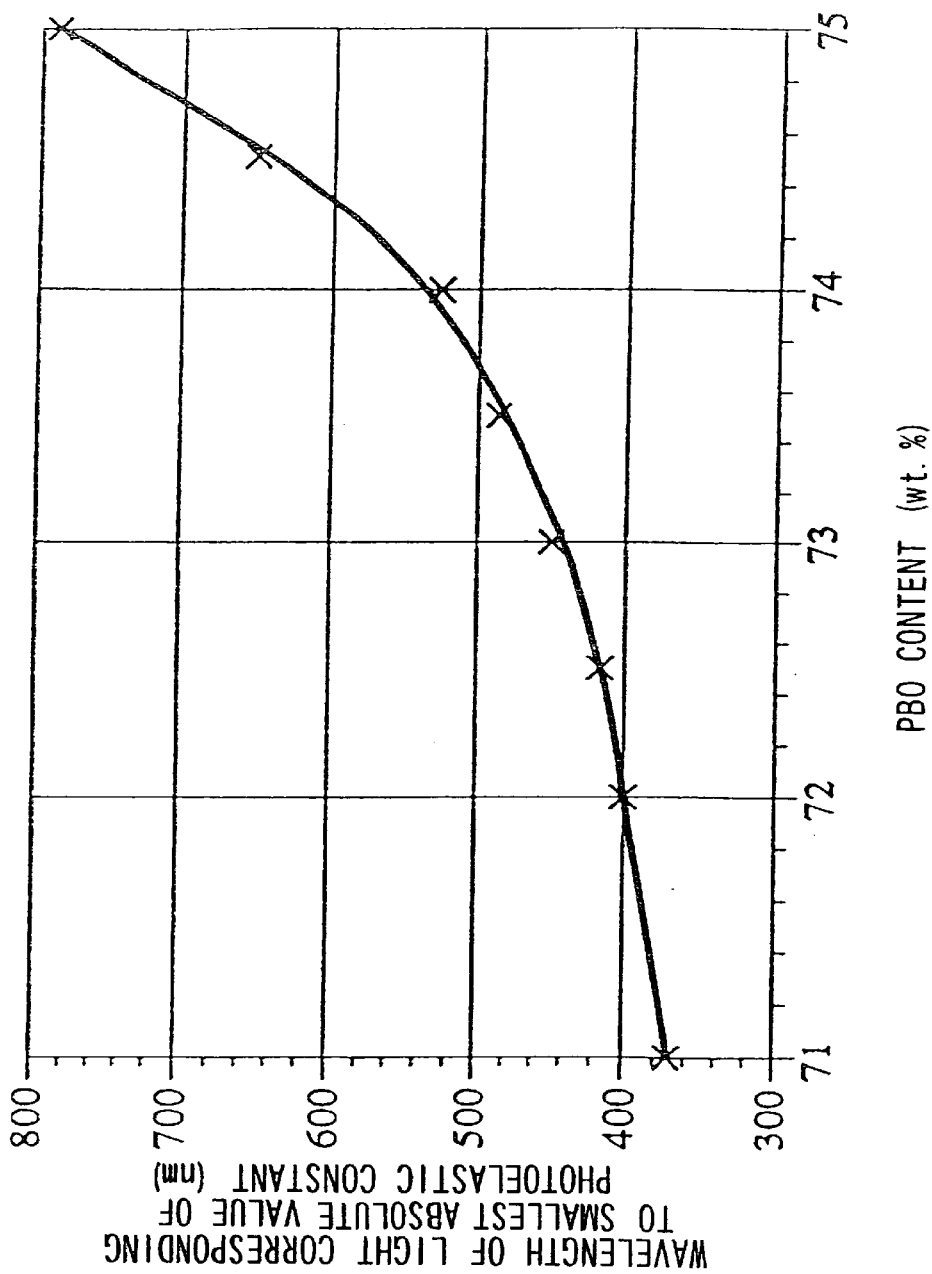
FIG. 5 is a characteristics diagram of the relationship between the PbO content in the optical material used to constitute the polarizing devices (polarization beam splitter) in an embodiment of the present invention and the wavelength at which the absolute value of the photoelastic constant is the smallest.

FIG. 5 presents a graph of the relationship between the content (wt. %) of PbO which is a crucial constituent in determining the photoelastic constant and the wavelength of light at which the absolute value of the photoelastic constant is the smallest.

Figure 6:
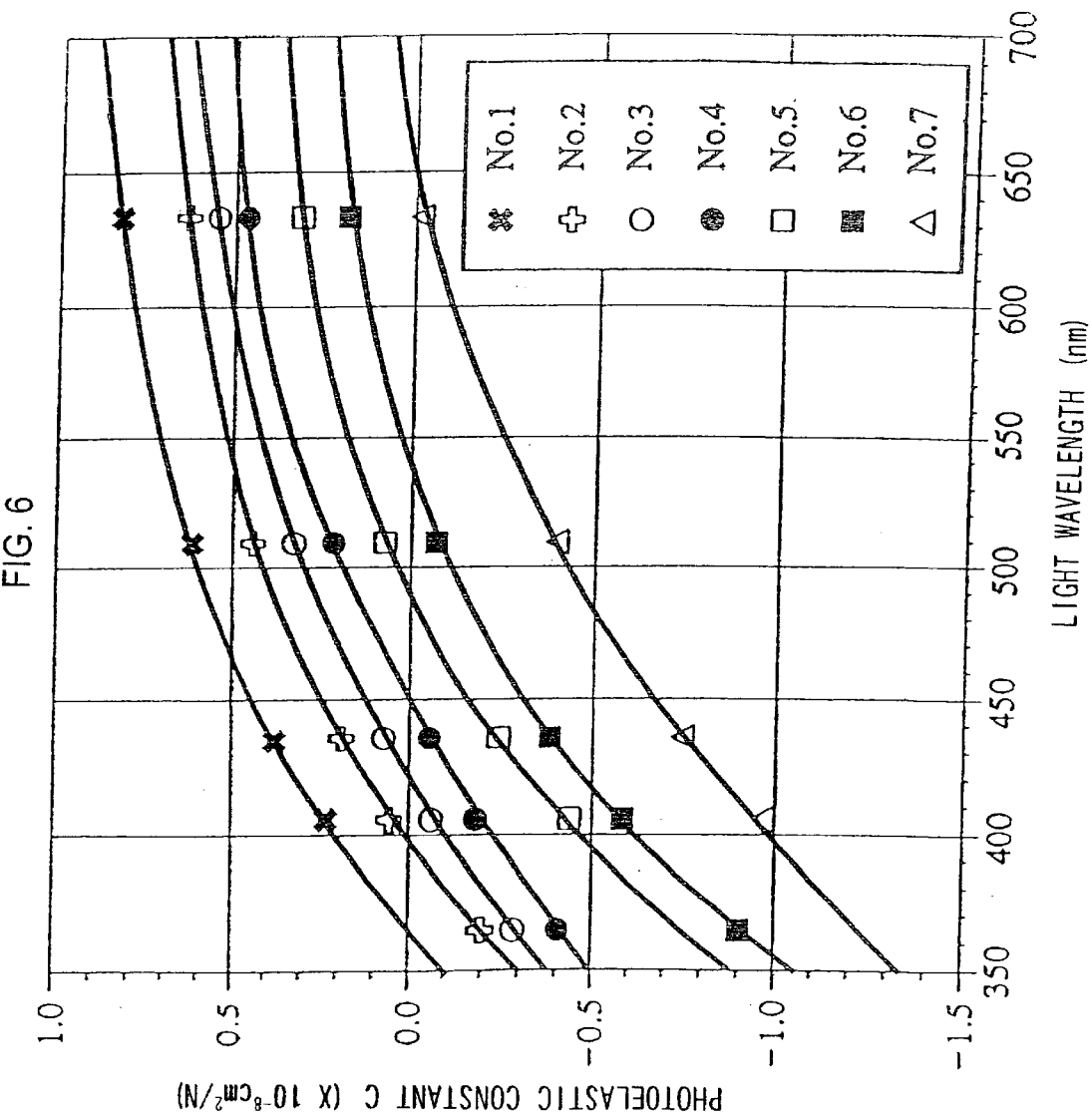
FIG. 6 illustrates the wavelength dependency of the photoelastic constants of the optical materials listed in FIG. 4.
Figure 7:
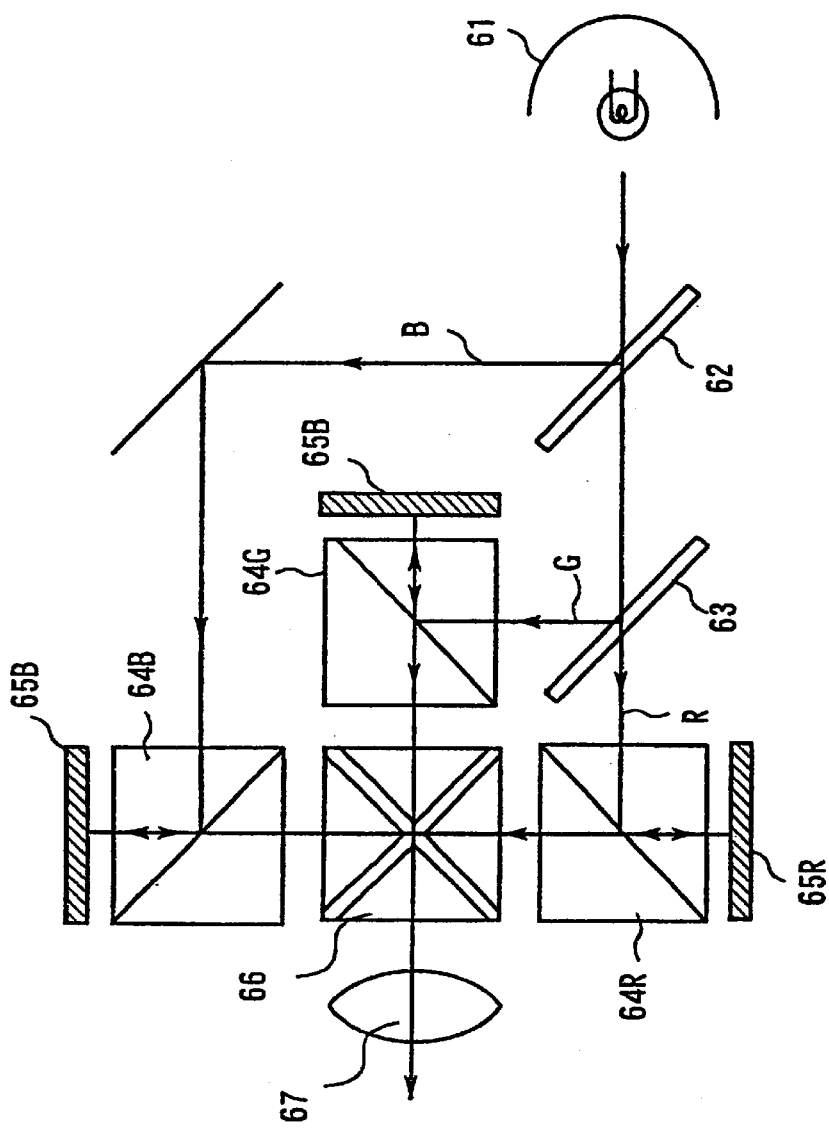
FIG. 7 shows the structure adopted in a projector in the prior art.

FIG. 6 shows the wavelength dependency of the photoelastic constants of materials No. 1~No. 7 in FIG. 4.

As the seven graphs representing the wavelength dependency of the photoelastic constant C indicate in FIG. 6, the photoelastic constant of each of materials No. 1~No. 7 assumes negative values over the range of wavelengths shorter than the wavelength at which the photoelastic constant C is 0 and assumes positive values over the range of wavelengths greater than the wavelength at which the photoelastic constant C is 0. In addition, each of these graphs is convex upwards. If the absolute value of the photoelastic constant C of a given material is equal to or less than $1.5 \times 10^{-8}$ cm$^2$/N within the operating wavelength range, the material may be considered to achieve characteristics required to assure satisfactory performance in practical use. In the embodiment, material No. 6 in FIG. 4 is used to constitute the first prism members 13-1 and the second prism members 13-2.

A material with a small photoelastic constant C such as material No. 6 in FIG. 4 has a large specific gravity of approximately 5.5. Compared to the specific gravity of the BK7 glass material mentioned earlier which is 2.5, the material with a smaller photoelastic constant C is bound to be considerably heavier. For this reason, too, the volumes of the first prism members 13-1 and the second prism members 13-2 should be reduced as much as possible to achieve a lightweight polarizing device and, ultimately, a lightweight projector.

As explained above, in the projector that utilizes the polarizing device in the embodiment, the advancing light corresponding to the individual colors resulting from the color separation achieved at the dichroic mirrors 8, 9 and 12 are reflected at the bending mirrors 10 and 11 at which the optical axes achieve an angle of incidence smaller than 45° (42° in the embodiment) and then are guided to the polarization splitter portions 13Rp 13Gp and 13Bp of the corresponding polarization beam splitters 13R, 13G and 13B each at an angle of incidence of 42°. As a result, the lengths of the optical paths of the light corresponding to the individual colors through which they travel from the light valves 14R, 14G and 14B to the projection lens 16 via the polarization beam splitters 13R, 13G and 13B and the cross dichroic prism 15, as shown in FIG. 1 can be reduced.

Let us now consider light fluxes exiting through the surfaces of the light valves 14R, 14G and 14B and reaching the projection lens 16, which achieve a numerical aperture (NA) determined by the aperture stop of the projection lens 16. In the projector that utilizes the polarizing device achieved in this embodiment, the diameter (area) of the sections of the light fluxes taken along the planes perpendicular to the optical axes of the light fluxes traveling through the individual polarization beam splitters 13R, 13G and 13B and the cross dichroic prism can be reduced for light fluxes with a numerical aperture equal to that in a projector in the prior art by reducing the optical path lengths as described above. Thus, the sizes of the polarization beam splitters 13R, 13G and 13G and the cross dichroic prism 15 can be reduced and this, combined with the reduced optical path lengths mentioned above makes it possible to achieve a more compact and lightweight projector.

It is to be noted that while the explanation has been given on an example in which material No. 6 in FIG. 4 is used in reference to the embodiment, the extent of a change occurring in the polarization states can be kept down to a level at which no problem arises in practical use as long as the absolute value of the photoelastic constant C is equal to or less than $1.5 \times 10^{-8}$ cm$^2$/N when a material other than material No. 6 is used as well.

In addition, materials assigned with different numbers in FIG. 4 may be used in correspondence to the different colors. In other words, by constituting the polarization beam splitters 13R, 13G and 13B in FIG. 1 with materials, the absolute values of the photoelastic constants C of which are the closest to 0 in correspondence to the individual color light fluxes with varying wavelength ranges, the extent to which the polarization states change when the polarized light passes through the polarizing device can be minimized. Thus, the contrast of the projected image is further improved.

While different color light fluxes enter the polarization splitter portions 13Rp, 13Gp and 13Bp of the polarization beam splitters 13R, 13G and 13B constituting the polarizing device at a 42° angle in the explanation of the embodiment given above, the present invention is not restricted by such details with regard to the angle. Namely, as long as the angle of incidence is set smaller than 45° by selecting appropriate refractive indices for the polarization beam splitters 13R, 13G and 13B, selecting the appropriate materials to be deposited to form the polarization splitter portions 13Rp 13Gp and 13Bp and setting appropriate film thickness over which the polarization splitter portions 13Rp 13Gp and 13Bp are formed, a polarizing device and a projector achieving advantages similar to those explained in reference to the embodiment are provided.

Variation 1 of Polarization Beam Splitter

In the polarization beam splitter 13 illustrated in FIG. 3A, the S-polarized light having entered the first prism member 13-1 is reflected at the polarization splitter portion 13p and is guided to the light valve 13R (13G, 13B). Then, the P-polarized light resulting from the modulation achieved while the light is reflected at the light valve 13R (13G, 13B) is analyzed at the polarization splitter portion 13p and then is guided to the cross dichroic prism 15 (see FIG. 1) constituting the color composition system. Instead, P-polarized light entering the first prism member 13-1 may be allowed to be transmitted instead of being reflected at the polarization splitter portion 13p and guided to the light valve 13R (13G, 13B) as shown in FIG. 3B In this case, the S-polarized light resulting from the modulation achieved while the P-polarized light is reflected at the light valve 13R (13G, 13B) should be detected at the polarization splitter portion 13p and be guided to the cross dichroic prism 15 (see FIG. 1) constituting the color composition system. It is to be noted that since it is necessary to allow the P-polarized light to enter the polarization beam splitter 13 in this structure, the halfwave plates 6 provided at the exit surfaces of the polarization beam splitter prisms 52, 54, 56 and 58 in FIG. 2 should instead be provided at the exit surfaces of the polarization beam splitter prisms 51, 53, 55, 57 and 59.

The shapes that may be assumed by the first prism member 13-1 and the second prism member 13-2 to guide the P-polarized light to the polarization beam splitter 13 are now explained in reference to FIG. 3B showing the shape of the section of the polarization beam splitter 13R, 13G or 13B taken along the X Y plane in FIG. 1. It is to be noted that while the polarization beam splitter in FIG. 3B is assigned with reference numeral 13 as is in FIG. 3A, the polarization beam splitters 13R, 13G and 13B all assume a shape identical to that of the polarization beam splitter 13 in FIG. 3B. In addition, the cross sectional shape explained below invariably refers to the shape of the section taken along the XY plane in FIG. 1.

As is the polarization beam splitter shown in FIG. 3A, the polarization beam splitter 13 is constituted by inserting and bonding a polarization splitter portion 13p between the first prism member 13-1 and the second prism member 13-2. The polarization splitter portion 13p, which is formed through deposition, only needs to be formed at the bonding surface of either the first prism member 13-1 or the second prism member 13-2. In the following explanation, the sides facing opposite the individual interior angles a, b, . . . e and f of the first prism member 13-1 and the second prism member 13-2 are referred to as sides A, B, . . . F as in the explanation given earlier in reference to FIG. 3A.

The first prism member 13-1 is formed so that section achieves a triangular shape having the interior angle a set at 42°, the interior angle b set at 90° and the interior angle c set at 48°. The shape of the section of the second prism member 13-2 is an isosceles triangle with the interior angles e and f equal to each other and the interior angle d being an obtuse angle, and the interior angles e and f are set equal to the interior angle a In other words, the interior angles e and f are both set at 42°, with the interior angle d set at 96° in the embodiment. The first prism member 13-1 and the second prism member 13-2 are formed as triangular prisms each achieving a thickness along the direction perpendicular to the sheet of paper on which FIG. 3B is drawn. It is to be noted that the vertices of the interior angles e and f of the second prism member 13-2 are indicated by dotted lines in FIG. 3B since any unnecessary portions are eliminated. The first prism member 13-1 and the second prism member 13-2 are bonded to each other at the surface on side B, one of the two sides B and C forming the interior angle a of the first prism member 13-1 which is equal to the two equal acute interior angles e and f of the second prism member 13-2 and at the surface on side D facing opposite the obtuse angle of the second prism member 13-2.

The P-polarized light having entered the polarization beam splitter 13 is transmitted through the polarization splitter portion 13p, advances through the second prism member 13-2 and exits through the surface on side E to enter the light valve 13R (13G, 13B). The light having been reflected at the light valve 13R (13G, 13B) and having become mixed light containing modulated light and unmodulated light enters the second prism member 13-2 through the surface on side E, one of the two sides E and F enclosing the obtuse interior angle d of the second prism member 13-2, and the S-polarized light alone is analyzed and reflected at the polarization splitter portion 13p to exit the second prism member 13-2 through the surface on side F, one of the two sides E and F mentioned earlier. By adopting the structure assumed in the polarization beam splitter 13 shown in FIG. 3B, too, the lengths of the optical paths of the light corresponding to the individual colors travelling from the light valves 14R, 14G and 14B through the corresponding polarization beam splitters 13R, 13G and 13B and the cross dichroic prism 15 to the projection lens 16 can be reduced as in the example presented in FIG. 3A. As a result, the sizes of the polarization beam splitters 13R, 13G and 13B and the cross dichroic prism 15 can be reduced for reasons similar to those explained earlier, and this, combined with the reduced optical path lengths explained above, ultimately reduces the size and the weight of the projector.

Variation 2 of Polarization Beam Splitter

While one of the two prism members constituting the polarization beam splitter 13 is an isosceles triangular prism with its two interior angles set at 42° and the other prism member is a right angle triangular prism both in the examples presented in FIG. 3A and FIG. 3B, both of these prisms may be isosceles triangular prisms each with two interior angles set at 42°.

The structure described above is illustrated in FIG. 3C. The first prism member 13-1 and the second prism member 13-2 are constituted of obtuse isosceles triangular prisms, with the interior angles b, c, d and f set at 42° and the interior angles a and e set at 96°. As a result, the sectional shape of the polarization beam splitter 13 as a whole is a parallelogram. The optical axis of incident light enters the polarization splitter portion 13p at a 42° angle, and if the light is S-polarized light, it is reflected and exits through surface C to enter the light valve 13R (13G, 13B). If, on the other hand, the incident light is P-polarized light, it passes through the polarization splitter portion and keeps advancing until it exits through surface D to enter the light valve 13R (13G, 13B) indicated by the dotted line. In either case, the modulated light exits through surface F. Since the prism members required in this structure have identical shapes, the necessity for preparing two different types of prisms is eliminated.

What is claimed is:

1. A polarizing device comprising:
   a first prism having a substantially triangular shape;
   a second prism having a substantially triangular shape and bonded to the first prism; and
   a polarization splitter film provided at a bonding surface at which the first prism and the second prism are bonded to each other, wherein,
   a shape of a section of the first prism being determined to allow an optical axis of light having entered perpendicularly to one surface of the first prism to enter the polarization splitter film with an angle of incidence smaller than 45° and to allow an optical axis of the light reflected at the polarization splitter film to exit perpendicularly from an exit surface of the first prism.

2. A polarizing device comprising:
   a triangular first prism with a section having a substantially isosceles triangular shape and a first interior angle which is an obtuse angle, and a second interior angle and a third interior angle which are acute angles equal to each other;
   a triangular second prism with a section having a substantially triangular shape and a first interior angle equal to the second interior angle and the third interior angle of the first prism; and
   a polarization splitter film provided at a bonding surface at which a first surface of the first prism, which faces opposite the first interior angle, and one surface of the second prism, which is one of two surfaces enclosing the first interior angle of the second prism, are bonded to each other, wherein
   a second surface and a third surface respectively face opposite the second interior angle and the third interior angle of the first prism, an angle of incidence at the polarization splitter film of an optical axis of light having entered perpendicularly to the second surface is equal to the second interior angle and the third interior angle of the first prism, and the light reflected at the polarization splitter film exits through the third surface of the first prism.

3. A polarizing device comprising:
   a first prism with a section having a substantially isosceles triangular shape and a first interior angle which is an obtuse angle, and a second interior angle and a third interior angle which are acute angles equal to each other;
   a second prism with a section having a substantially triangular shape and at least one first interior angle set equal to the second interior angle and the third interior angle of the first prism, which are acute angles; and
   a polarization splitter film provided at a bonding surface at which a first surface of the first prism facing opposite the first interior angle and a first surface which is one of two surfaces enclosing the first interior angle of the second prism, are bonded to each other, wherein
   an optical axis of light is allowed to enter the second prism perpendicularly to a second surface, which is one of the two surfaces enclosing the first interior angle of the second prism, and light transmitted through the polarization splitter film exits through a second surface of the first prism facing opposite the second interior angle.

4. A projector comprising:
   a color separation optical system that separates a light flux emitted by a light source into light fluxes corresponding to a plurality of colors;
   a plurality of light valves provided in correspondence to the plurality of colors of light fluxes respectively;
   a plurality of polarizing devices provided to achieve polarization splitting of the light fluxes corresponding to the plurality of colors having exited the color separation optical system, and guide the light fluxes to the plurality of light valves and individually analyze the light fluxes corresponding to the plurality of colors having been modulated at the plurality of light valves; and
   a color composition optical system that composes the light fluxes corresponding to the plurality of colors having been analyzed at the plurality of the polarizing devices and having exited the plurality of polarizing devices,
   wherein each of the polarizing devices comprises,
      a first prism having a substantially triangular shape,
      a second prism having a substantially triangular shape and bonded to the first prism,
      a polarization splitter film provided at a bonding surface at which the first prism and the second prism are bonded to each other, and
      a shape of a section of the first prism being determined to allow an optical axis of light having entered perpendicularly to one surface of the first prism to enter the polarization splitter film with an angle of incidence smaller than 45° and to allow an optical axis of the light reflected at the polarization splitter film to exit perpendicularly from an exit surface of the first prism.

5. An optical apparatus comprising:

a light valve; and a light analyzing device that analyzes light exiting the light valve, wherein the light analyzing device comprises,
- a first prism having a section with a substantially triangular shape,
- a second prism having a section with a substantially triangular shape and bonded to the first prism,
- a polarization splitter film provided between bonding surfaces of the first prism and the second prism, and
- the shape of the section of the first prism being determined to allow an optical axis of light having entered perpendicularly to one surface of the first prism from the light valve to enter the polarization splitter film with an angle of incidence smaller than 45° and to allow an optical axis of the light reflected at the polarization splitter film to exit perpendicularly from an exit surface of the first prism.

6. An optical apparatus comprising:

a light valve; and a light analyzing device that analyzes light exiting the light valve, wherein the light analyzing device comprises,
- a first prism with a section having a substantially isosceles triangular shape and a first interior angle which is an obtuse angle, and a second interior angle and a third interior angle which are acute angles equal to each other,
- a second prism with a section having a substantially triangular shape and at least one first interior angle equal to the second interior angle and the third interior angle of the first prism, which are acute angles,
- a polarization splitter film provided at a bonding surface at which a first surface of the first prism facing opposite the first interior angle and a first surface which is one of two surfaces enclosing the first interior angle of the second prism, are bonded to each other, and
- a second surface and a third surface facing opposite the second interior angle and the third interior angle, respectively, of the first prism, and the light having exited the light valve being caused to enter the first prism through the second surface of the first prism.

7. An optical apparatus according to claim 6, wherein analyzed light in light, which has exited the light valve and entered through the second surface of the first prism at the light analyzing device, exits through the third surface of the first prism or the second surface of the second prism.

8. A projection type display apparatus comprising:

a light valve;

an optical device that guides light obtained by achieving polarization splitting on incident light to the light valve, and analyzes light having exited the light valve; and a projection lens that projects the light analyzed by the optical device, wherein,
the optical device comprises a first prism and a second prism, both with a section having a substantially triangular shape, and a polarization splitter film provided at a bonding surface between the first prism and the second prism, and an optical axis of the incident light having entered perpendicularly to one surface of the first prism, enters the polarization splitter film at an angle of incidence smaller than 45°, and reflected light having been reflected at the polarization splitter film, an optical axis of which exits perpendicularly from an exit surface of the first prism, or transmitted light achieved through the polarization splitter film, is allowed to enter the light valve.

9. A projection type display apparatus comprising:

a light valve;

an optical device that guides light obtained by achieving polarization splitting on incident light to the light valve, and analyzes light having exited the light valve; and a projection lens that projects the light analyzed by the optical device, wherein the optical device comprises,
- a first prism with a section having a substantially isosceles triangular shape and a first interior angle which is an obtuse angle, and a second interior angle and a third interior angle which are acute angles equal to each other,
- a second prism with a section having a substantially triangular shape and at least one first interior angle equal to the second interior angle and the third interior angle of the first prism, which are acute angles,
- a polarization splitter film provided at a bonding surface at which a first surface of the first prism facing opposite the first interior angle and a first surface which is one of two surfaces enclosing the first interior angle of the second prism, are bonded to each other, and
- a second surface and a third surface facing opposite the second interior angle and the third interior angle of the first prism, respectively, an optical axis of the incident light entering the first prism perpendicularly to the second surface of the first prism, and an optical axis of reflected light obtained at the polarization splitter film exiting the first prism perpendicularly from the third surface of the first prism to enter the light valve.

10. A projection type display apparatus comprising:

a light valve;

an optical device that guides light obtained by achieving polarization splitting on incident light to the light valve, and analyzes light having exited the light valve; and a projection lens that projects the light analyzed by the optical device, wherein the optical device comprises,
- a first prism with a section having a substantially isosceles triangular shape and a first interior angle which is an obtuse angle, and a second interior angle and a third interior angle which are acute angles equal to each other,
- a second prism with a section having a substantially triangular shape and at least one first interior angle equal to the second interior angle and the third interior angle, which are acute angles of the first prism,
- a polarization splitter film provided at a bonding surface at which a first surface of the first prism facing opposite the first interior angle and a first surface which is one of two surfaces enclosing the first interior angle of the second prism, are bonded to each other, and an optical axis of the incident light enters the second prism perpendicularly to a second surface which is one of the two surfaces enclosing the first interior angle of the second prism, and light having been transmitted through the polarization splitter film exits the first prism through a second surface of the first prism to enter the light valve.

11. A compound prism member comprising:

a triangular first prism with a section having a substantially isosceles triangular shape and a first interior angle which is an obtuse angle, and a second interior angle and a third interior angle which are acute angles equal to each other;

a triangular second prism with a section having a substantially triangular shape and at least one first interior angle equal to the second interior angle and the third interior angle of the first prism, which are acute angles; and a polarization splitter film provided at a bonding surface at which a first surface of the first prism facing opposite the first interior angle and a first surface that is one of two surfaces enclosing the first interior angle of the second prism, are bonded to each other.

12. A projector comprising:

a color separation optical system that separates a light flux emitted by a light source into light fluxes corresponding to a plurality of colors;

a plurality of light valves provided in correspondence to the plurality of colors of light fluxes, respectively;

a plurality of polarizing devices provided to achieve polarization splitting of the light fluxes corresponding to the plurality of colors having exited the color separation optical system, and to guide the light fluxes to the plurality of light valves and individually analyze the light fluxes corresponding to the plurality of colors having been modulated at the plurality of light valves and then guided to the plurality of polarizing devices; and a color composition optical system that composes the light fluxes corresponding to the plurality of colors having been analyzed at the plurality of the polarizing devices and having exited the plurality of polarizing devices, wherein, the plurality of polarizing devices each includes a first prism having a substantially triangular shape, a second prism having a substantially triangular shape, and a polarization splitter film, through which one light flux emitted from the color separation optical system undergoes polarization splitting and is guided to one of the light valves, and the one light flux having been modulated at the light valve and having been guided to the polarization splitter film is analyzed, the polarization splitter film being provided at a bonding surface at which the first prism and the second prism are bonded to each other, and the first prisms, the second prisms and the polarization splitter films at the plurality of polarizing devices are formed to ensure that optical axes of light fluxes corresponding to the plurality of colors, having been analyzed at the plurality of polarizing devices, and having exited the plurality of polarizing devices enter the color composition optical system parallel to one another or perpendicular to one another, that the optical axes of the light fluxes corresponding to the plurality of colors exiting the color separation optical system enter perpendicularly to incident surfaces of the plurality of polarizing devices and then enter the polarization splitter films at an angel of incidence smaller than 45°, and that the optical axes of the light fluxes having been reflected and having been analyzed at the polarization splitter films exit perpendicularly from exit surfaces.

* * * * *

UNITED STATES PATENT AND TRADEMARK OFFICE
CERTIFICATE OF CORRECTION

PATENT NO. : 6,588,905 B2
DATED : July 8, 2003
INVENTOR(S) : Atsushi Sekine

It is certified that error appears in the above-identified patent and that said Letters Patent is hereby corrected as shown below:

<u>Column 20,</u>
Line 33, change "angel" to -- angle --.

Signed and Sealed this

Sixth Day of January, 2004

JAMES E. ROGAN
*Director of the United States Patent and Trademark Office*